United States Patent [19]

Yuasa et al.

[11] 4,229,088
[45] Oct. 21, 1980

[54] EXPOSURE TIME CONTROLLING SYSTEM

[75] Inventors: Yoshio Yuasa, Kawachinagano; Nobuyuki Taniguchi, Sakai, both of Japan

[73] Assignee: Minolta Camera Kabushiki Kaisha, Osaka, Japan

[21] Appl. No.: 16,607

[22] Filed: Mar. 1, 1979

[30] Foreign Application Priority Data

Mar. 1, 1978 [JP] Japan .................................. 53-23908

[51] Int. Cl.³ ........................... G03B 7/08; G03B 9/62
[52] U.S. Cl. ................................... 354/23 D; 354/24; 354/50; 354/234
[58] Field of Search ............... 354/23 D, 24, 50, 60 A, 354/234, 235

[56] References Cited

U.S. PATENT DOCUMENTS 3,995,284  11/1976  Kitaura et al. .................... 354/23 D
4,139,289  2/1979  Yamada et al. .................... 354/23 D

FOREIGN PATENT DOCUMENTS 50-78324  6/1975  Japan .

*Primary Examiner*—Michael L. Gellner
*Attorney, Agent, or Firm*—Wenderoth, Lind & Ponack

[57] ABSTRACT

An exposure time controlling system includes a circuit for producing an APEX shutter speed signal which is applied to a first discriminator for briefly classifying the APEX shutter speed signal into four classes and also to a second discriminator for sub-classifying the APEX shutter speed signal. A pulse generator is provided for producing pulse signal having a frequency determined by the class and a counter is provided for counting the pulses for a number of times determined by the subclass. A shutter mechanism is opened when the counter starts to count and is closed when the counter finishes counting the pulses.

10 Claims, 9 Drawing Figures

EXPOSURE TIME CONTROLLING SYSTEM

BACKGROUND OF THE INVENTION

The present invention relates to an exposure time controlling system for use in a photographic device.

Generally, in photography, there is a close relation among the factors of: brightness or luminance of an object; sensitivily of a film; shutter speed; and size of an aperture. The relation among these factors can be expressed by a known system which is so-called additive system of photographic exposure, being abbreviated as APEX system. According to the APEX system, the relation can be expressed as follows:

$$Av + Tv = Sv + Bv \qquad (1)$$

in which Av is APEX value of the aperture, Tv is APEX value of the shutter speed, Sv is APEX value of the film sensitivity, Bv is APEX value of the luminance or brightness of the target object. Each of the APEX values is logarithmic values of the well known values. More particularly, $Av = 2 \cdot \log_2 F$ in which F is a f/stop number, $Tv = \log_2(1/T)$ in which T is the shutter speed, and $Sv = \log_2(NS)$ in which N is a constant value and S is the film sensitivity such as ASA number. When the APEX shutter speed value Tv is calculated by the use of the equation (1), the shutter speed T is calculated by the use of equation $T = 2^{-Tv}$. Thereafter, the shutter of the photographic device is so controlled as to be opened for a time period of $2^{-Tv}$ seconds.

Conventionally, there have been proposed various types of systems for controlling the shutter to be opened for the time period of $2^{-Tv}$ seconds, more particularly, for counting the time period of $2^{-Tv}$ seconds. By means of a conventional frequency divider, the time period $2^{-Tv}$ such as 1/60, 1/125, 1/250, 1/500, etc. can be easily obtained in case that Tv is integer. However, the exposure time available in this case are only by steps of 1 Ev. If a more delicate exposure time control by steps of a fraction of 1 Ev is desired, some complicated construction for obtaining various exposure times may be required.

SUMMARY OF THE INVENTION

Accordingly, it is an important object of the present invention to provide an improved exposure time controlling system which can delicately control the time duration of shutter speed.

It is also an important object of the present invention to provide an exposure time controlling system of the above described type which is simple in construction and can readily be manufactured at low cost.

In accomplishing these and other objects, an exposure time controlling system, according to the present invention, comprises a signal producing means for producing a signal indicative of the APEX shutter speed value and memorizing means for memorizing data corresponding to logarithmically expanded values of the various APEX shutter speed values. The data is memorized at addresses identified by various address data. The system further comprises means for reading out one of the data memorized at an address which is indentified by an address data designated by the signal of the producing means, and counting means for counting a period of time in response to the data read out from the reading means.

In accordance with a preferred embodiment, the exposure time controlling system of the present invention for controlling a time interval defined between the opening and closing of a shutter mechanism by the use of APEX shutter speed value comprises a start signal producing means, an APEX shutter speed signal producing means, classifying means for classifying the APEX shutter speed signal into one or more classes defined by the magnitude of the APEX shutter speed signal and for producing a class signal, and sub-classifying means for sub-classifying the APEX shutter speed signal in any one of the classes into a plurality of sub-classes defined by the magnitude of the APEX shutter speed signal and for producing a sub-class signal. The system of this preferred embodiment further comprises means for setting a reference time interval determined by the class signal and means responsive to the start signal for counting the reference time interval for a plurality of times determined by the sub-class signal. This counting means produces an end signal after the plurality of reference time interval is counted. Means responsive to the start signal is provided for opening the shutter mechanism and also means responsive to the end signal is provided for closing the shutter mechanism.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE PREFERRED EMBODIMENTS

Figure 1:
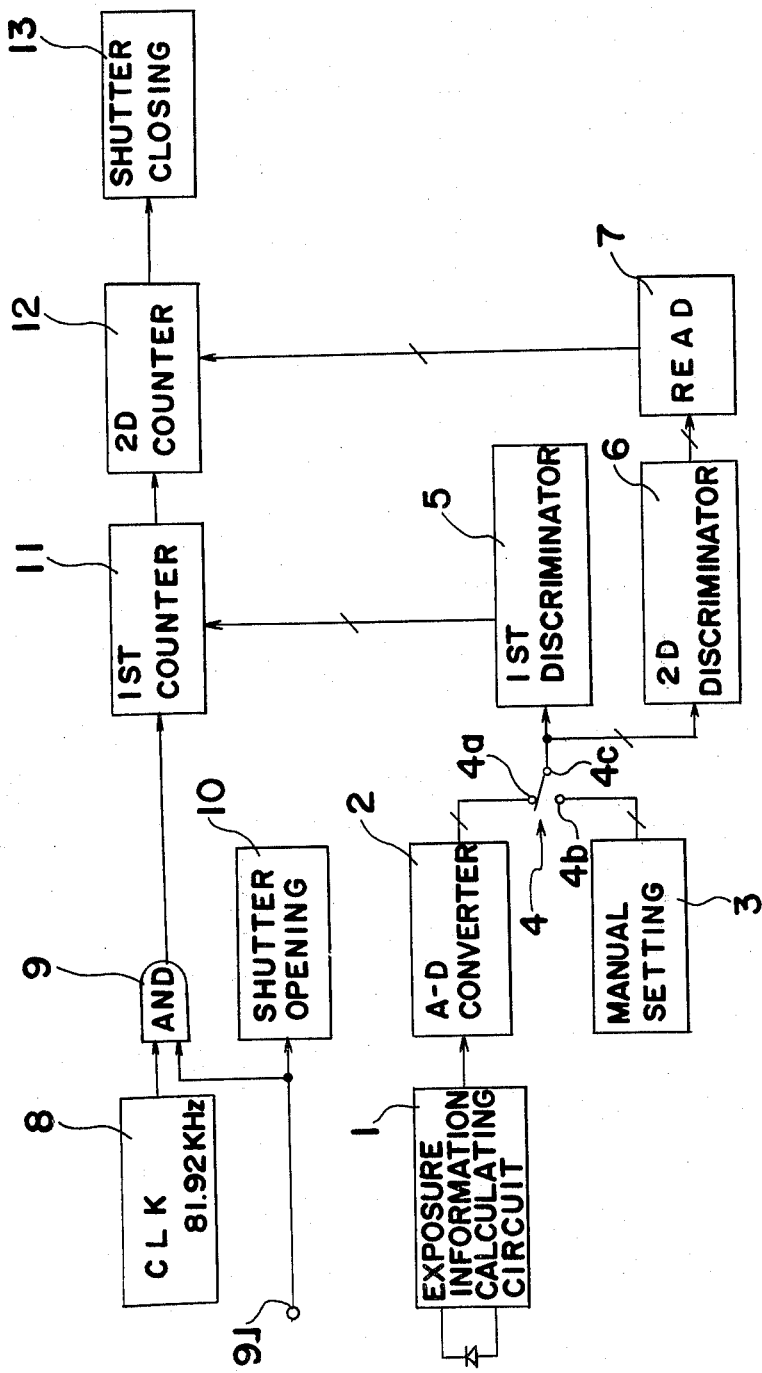
FIG. 1 is a block diagram of an exposure time controlling system of the present invention.

Before the description of the present invention proceeds, it is to be noted that like parts are designated by like reference numerals throughout the accompanying drawings.

In the drawings, a simple arrow such as seen between blocks 11 and 12 means that a signal is transmitted through single line, while an arrow crossed by a piece of line such as seen between blocks 7 and 12 means that a digital code signal is transmitted through a set of plural lines.

Referring to FIG. 1, there is shown a fundamental block diagram of an exposure time controlling system of the present invention. The system comprises an exposure information calculating circuit 1 which receives various informations such as aperture or f/stop information, film sensitivity information and brightness information in terms of their respective APEX values to calculate the APEX shutter speed value Tv by using the equation (1) described above. Since such calculating circuit 1 is not directly involved in the present invention, a further description therefor is omitted for the sake of brevity. The calculated APEX shutter speed value Tv produced from the calculating circuit 1 is in analog form and the value is converted into digital form in an analog digital converter (A–D converter) 2. Therefore, the output of the A–D converter 2 indicates the APEX shutter speed value Tv in digital form and is applied to the terminal 4a of a switch 4. A manual setting circuit 3 is provided for manually setting the APEX shutter speed value Tv in digital form and is connected to a terminal 4b of the switch 4. Therefore, a terminal 4c of the switch 4 receives the APEX shutter speed value Tv either from an automatic setting circuit, constituted by the exposure information calculating circuit 1 and A–D converter 2, or from the manual setting circuit 3.

A first discriminator 5 is connected to the terminal 4c for classifying the APEX shutter speed value Tv into one of a plurality of classes. According to a preferred embodiment, there are provided four classes. The first class covers $10 \geq Tv > 6$. The second class covers $6 \geq Tv > 2$. The third class covers $2 \geq Tv > -2$. And, the fourth class covers $-2 \geq Tv > -6$. After classifying the received APEX value Tv into one of the four classes, the first discriminator 5 produces a class signal constituted by two binary decimal digits "00", "01", "10" or "11" for the indication of the first, second, third or fourth class, respectively.

A second discriminator 6 is also connected to the terminal 4c for sub-classifying or positioning the detected APEX shutter speed value Tv in one of a number of detailed sub-classes. According to a preferred embodiment, each of the first to fourth classes has 16 sub-classes which are indicated by sub-class signals constituted by four-digit binary codes. It is to be noted that according to this embodiment, each of the sub-classes occupies a quater of one APEX shutter speed value. For example, a sub-class as identified by a sub-class signal (0000) in the first class occupies $10.00 \geq Tv > 9.75$. The details of the four classes defined by the first discriminator 5 and 16 sub-classes defined by the second discriminator 6 are shown in a table 1 given hereinafter.

For example, when the APEX shutter speed value Tv received from the terminal 4c is 4.98, the first discriminator 5 discriminates that the received APEX value 4.98 is in the second class and, at the same time, the second discriminator 6 discriminates that the value 4.98 falls in a sub-class of $5.00 \geq Tv > 4.75$. Therefore, the first discriminators 5 produces class signal "01" for the indication of the second class while the second discriminator 6 produces sub-class signal "0100" for the indication of fifth sub-class counted from a top in the second class.

A reading means 7 is connected to the second discriminator 6 for selecting a predetermined value TI corresponding to each of the 16 different sub-classes and for applying the selected value TI to a second counter 12 described later. The value TI to be selected for each of the sub-class signal is shown in the table 1 in the column under the heading "TI", in which the values TI therein are presented in the hexadecimal numbering system so that the digits thereof are 0, 1, 2, 3, 4, 5, 6, 7, 8, 9, A, B, C, D, E, F. A reference character H affixed to each of the values in the column under the heading "TI" and other values given hereinafter indicates that the value is presented in the hexadecimal numbering system. According to the above given example, the sub-class signal "0100" produced from the second discriminator 6 so actuates the reading means 7 as to read out a value 14H. This value 14H is applied to the counter 12.

The series of TI values listed in the column under the heading "TI" is obtained by calculating a ratio of $2^{Tv}:2^{Tv+0.25}:2^{Tv+0.5}:2^{Tv+0.75}:2^{Tv+1}:2^{Tv+3.75} = 1:1.1892::1.14142:1.6818:2::$ $13.454 \approx 10:12:14:17:20::136 = 0AH:0CH:0EH:11H:14H::88H$. The values in the column under the heading "TI" are stored in the reading means 7, which is preferably a read-only memory (ROM), where each of the values are memorized. The manner in which the read out of the value memorized in ROM is carried out is described hereinafter. The sub-class signal produced from the second discriminator 6 is added with a predetermined value "K" for obtaining an address data indicating a particular address of the ROM where a TI value corresponding to the sub-class is memorized. The various address data for the addresses containing the TI values are listed in the table 1 in the column under the heading "TIAdd".

The exposure time controlling system further comprises a clock pulse generator 8 for generating clock

TABLE 1

| | | First class | | | Second class | | | Third class | | | Fourth class | | |
| | | Tv' | | | Tv' | | | Tv' | | | Tv' | | |
| TIAdd | TI | Tv | Class signal | Sub-class signal | Tv | Class signal | Sub-class signal | Tv | Class signal | Sub-class signal | Tv | Class signal | Sub-class signal |
|---|---|---|---|---|---|---|---|---|---|---|---|---|---|
| K+0H | 0AH | 10.00 | 00 | 0000 | 6.00 | 01 | 0000 | 2.00 | 10 | 0000 | −2.00 | 11 | 0000 |
| K+1H | 0CH | 9.75 | 00 | 0001 | 5.75 | 01 | 0001 | 1.75 | 10 | 0001 | −2.25 | 11 | 0001 |
| K+2H | 0EH | 9.50 | 00 | 0010 | 5.50 | 01 | 0010 | 1.50 | 10 | 0010 | −2.50 | 11 | 0010 |
| K+3H | 11H | 9.25 | 00 | 0011 | 5.25 | 01 | 0011 | 1.25 | 10 | 0011 | −2.75 | 11 | 0011 |
| K+4H | 14H | 9.00 | 00 | 0100 | 5.00 | 01 | 0100 | 1.00 | 10 | 0100 | −3.00 | 11 | 0100 |
| K+5H | 18H | 8.75 | 00 | 0101 | 4.75 | 01 | 0101 | 0.75 | 10 | 0101 | −3.25 | 11 | 0101 |
| K+6H | 1CH | 8.50 | 00 | 0110 | 4.50 | 01 | 0110 | 0.50 | 10 | 0110 | −3.50 | 11 | 0110 |
| K+7H | 22H | 8.25 | 00 | 0111 | 4.25 | 01 | 0111 | 0.25 | 10 | 0111 | −3.75 | 11 | 0111 |
| K+8H | 28H | 8.00 | 00 | 1000 | 4.00 | 01 | 1000 | 0 | 10 | 1000 | −4.00 | 11 | 1000 |
| K+9H | 30H | 7.75 | 00 | 1001 | 3.75 | 01 | 1001 | −0.25 | 10 | 1001 | −4.25 | 11 | 1001 |
| K+AH | 38H | 7.50 | 00 | 1010 | 3.50 | 01 | 1010 | −0.50 | 10 | 1010 | −4.50 | 11 | 1010 |
| K+BH | 44H | 7.25 | 00 | 1011 | 3.25 | 01 | 1011 | −0.75 | 10 | 1011 | −4.75 | 11 | 1011 |
| K+CH | 50H | 7.00 | 00 | 1100 | 3.00 | 01 | 1100 | −1.00 | 10 | 1100 | −5.00 | 11 | 1100 |
| K+DH | 60H | 6.75 | 00 | 1101 | 2.75 | 01 | 1101 | −1.25 | 10 | 1101 | −5.25 | 11 | 1101 |
| K+EH | 70H | 6.50 | 00 | 1110 | 2.50 | 01 | 1110 | −1.50 | 10 | 1110 | −5.50 | 11 | 1110 |
| K+FH | 88H | 6.25 | 00 | 1111 | 2.25 | 01 | 1111 | −1.75 | 10 | 1111 | −5.75 | 11 | 1111 | pulses having a predetermined frequency. According to a preferred embodiment, the clock pulse generator 8 generates pulses having a frequency of 81920 Hz ($10 \cdot 2^{13}$ Hz). An AND gate 9 has two inputs, one of them being connected to the pulse generator 8 for receiving the clock pulse while the other of them is connected to a terminal 91 which receives a signal for opening a shutter mechanism. The terminal 91 is also connected to a shutter opening control means 10 for opening a shutter mechanism (not shown). For example, in the case where the present system is employed in a camera, a suitable camera operation succeeding to a push-down of a shutter button provides high level signal to the terminal 91 for actuating the shutter opening control means 10 to open the shutter mechanism and, at the same time, for actuating the AND gate 9. The signal applied to the terminal 91 is maintained high for a predetermined period of time for allowing the clock pulse to pass through the gate 9 during said predetermined period of time. The clock pulse passed through the AND gate 9 is applied to a counter 11 which divides the frequency of the clock pulse by one of the divisors $2^3$, $2^7$, $2^{11}$ or $2^{15}$ so as to vary the frequency of the clock pulse. When the frequency of the clock pulse is divided by $2^3$, that is 8, the counter 11 produces clock pulse having frequency of 10240 Hz ($10 \cdot 2^{10}$ Hz). When the frequency of the clock pulse is divided by $2^7$, that is, 128, the counter 11 produces clock pulse having frequency of 640 Hz ($10 \cdot 2^6$ Hz). When the frequency of the clock pulse is divided by $2^{11}$, that is, 2048, the counter 11 produces clock pulse having frequency of 40 Hz ($10 \cdot 2^2$ Hz). When the frequency of the clock pulse is divided by $2^{15}$, that is, 32768, the counter 11 produces clock pulse having frequency of 2.5 Hz ($10 \cdot 2^{-2}$ Hz). Such reduction of frequency of the clock pulse in the counter 11 is effected by the class signal produced from the first discriminator 5. More particularly, when the class signal "00", "01", "10" or "11" is produced from the first discriminator 5, the counter 11 produces clock pulse having frequency of 10240 Hz, 640 Hz, 40 Hz or 2.5 Hz, respectively. The clock pulse generated from the counter 11 is applied to the counter 12 for counting a predetermined number of pulses determined by the signal indicative of TI value received from the reading means 7. After counting the predetermined number of pulses, the counter 12 generates a control signal which is applied to a shutter closing control means 13. In the case of camera, the shutter closing control means closes the shutter mechanism which has been previously opened by the operation of shutter opening control means 10.

The operation of the exposure time controlling system described above is given hereinbelow. Assuming that the terminal 4c is applied with APEX shutter speed value 4.98 by the manual or automatic circuit, the first discriminator 5 produces the class signal "01" and the second discriminator 6 produces the sub-class signal "0100" in the manner described above. Upon receipt of the class signal "01" from the first discriminator 5, the first counter 11 is ready to generate clock pulse having frequency of 640 Hz ($10 \cdot 2^6$ Hz). Simultaneously, upon receipt of sub-class signal "0100" from the second discriminator 6, the reading means 7 produces a TI value 14H which is previously memorized in the address identified by an address data "K+4H". It is to be noted that the value "4" in the address "K+4H" corresponds to the value of sub-class signal "0100". The TI value 14H produced from the reading means 7 is applied to the second counter 12 so that the second counter 12 may count 14H (corresponding to 20 according to the decimal numbering system) pulses received from the first counter 11, that is, the pulses having the frequency of 640 Hz.

After the system is prepared in a manner described above, the first and second counters 11 and 12 are ready to actually count to control the shutter speed. Upon a suitable timing succeeding to pushing of the shutter button, the signal applied to the terminal 91 actuates the control means 10 to open the shutter mechanism and, at the same time, the clock pulse from the pulse generator 8 is fed through the AND gate 9 to the first counter 11 in which the frequency of the clock pulse is reduced from 81920 Hz ($10 \cdot 2^{13}$ Hz) to 640 Hz ($10 \cdot 2^6$ Hz). In the second counter 12, the frequency reduced pulse is counted by the number of 14 H (corresponding to 20 according to the decimal numbering system). After the completion of counting, that is, after a time interval of $20 \times (1/10 \cdot 2^6)$ seconds (equal to 1/32 seconds), the second counter 12 generates a signal to the shutter closing control means 13 for closing the shutter mechanism, thereby completing one cycle of operation of the exposure time controlling system.

Figures 2A, 2B:
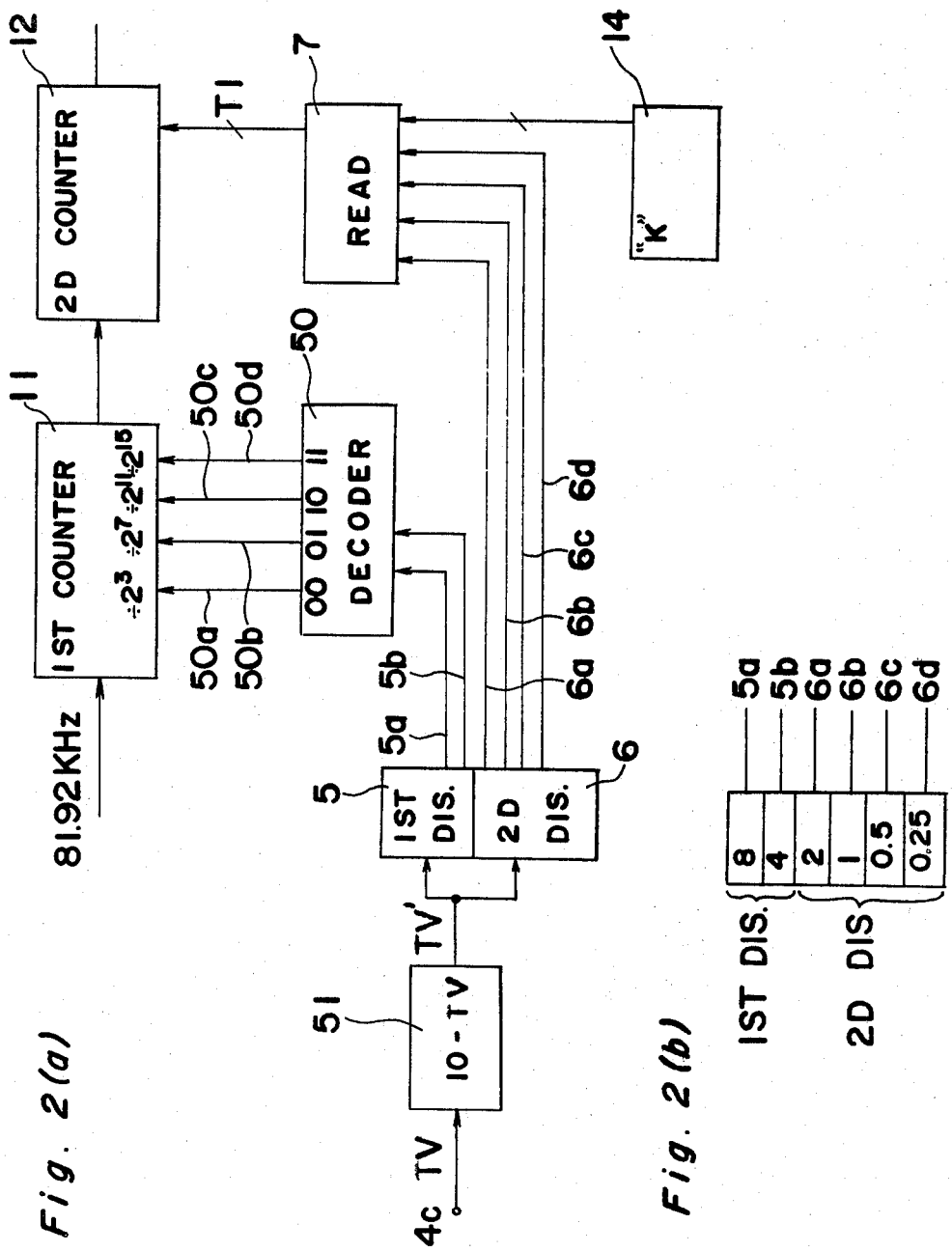
FIG. 2(a) is a detailed block diagram of a portion of a diagram shown in FIG. 1.
FIG. 2(b) is a schematic view showing an alignment of elements contained in first and second discriminators shown in FIG. 2(a)

Referring to FIG. 2(a), there is shown a fragmentary block diagram of the exposure time control system according to one preferred embodiment of the present invention. According to this embodiment, the shutter speed APEX value Tv from either one of the A-D converter 2 and manual setting 3 is applied to a digital calculator 51 which carries out a calculation of "10-Tv". It is to be noted that, according to this embodiment, the input signal applied to the terminal 4c is any one of the values given in the column under the heading "Tv" in the table 1. The difference obtained from the calculator 51, identified as a difference APEX value or a modified APEX value Tv', is applied to the first and second discriminators 5 and 6. In the first and second discriminators 5 and 6, the modified APEX value Tv' is expressed by six binary digits which have the weights of 8, 4, 2, 1, 0.5 and 0.25, respectively, as shown in FIG. 2(b). The signals for the first two binary digits having weighing values of 8 and 4 are produced from the first discriminator 5 through output lines 5a and 5b, respectively. The signals for the remaining four binary digits having weighing values of 2, 1, 0.5 and 0.25 are produced from the second discriminator 6 through output lines 6a, 6b, 6c and 6d, respectively.

For example, when the APEX shutter speed value Tv is 4.25, the calculator 51 produces the difference APEX value 5.75. Since this value 5.75 can be expressed as $(8 \times 0 + 4 \times 1 + 2 \times 0 + 1 \times 1 + 0.5 \times 1 + 0.25 \times 1)$, the outputs from the lines 5a, 5b, 6a, 6b, 6c and 6d are 0, 1, 0, 1, 1, and 1, respectively. This combination of binary signals from the outputs 5a, 5b, 6a, 6b, 6c and 6d coincides with combination of class and sub-class signals with respect to the APEX shutter speed value 4.25, as apparent from the table 1.

The output lines 5a and 5b are applied to a decoder 50 which has four outputs connected to the first counter 11 through lines 50a, 50b, 50c and 50d. When the signals on the lines 5a and 5b are low, identifying the first class, the decoder 50 provides an actuating signal through the line 50a for effecting the frequency reduction from 81.92 KHz to 10240 Hz by the divisor $2^3$. Similarly, when the signals on the lines 5a and 5b are low and high, identifying the second class, the decoder 50 provides an actuating signal through the line 50b for effecting the frequency reduction to 640 Hz by the divisor $2^7$. Moreover, when the signals on the lines 5a and 5b are high and low, identifying the third class, the decoder 50 provides an actuating signal through the line 50c for effecting the frequency reduction to 40 Hz by the divisor $2^{11}$. Finally, when the signals on the lines 5a and 5b are both high, identifying the fourth class, the decoder 50 provides an actuating signal through the line 50d for effecting the frequency reduction to 2.5 Hz by the divisor $2^{15}$.

The output lines 6a, 6b, 6c and 6d carrying sub-class information is applied to the reading means 7 to designate lower four bits of an address in the reading means 7. A predetermined value "K" from a "K" producing circuit 14 is also applied to the reading means 7 to designate higher n bits of the address. Thus, the combination of sub-class number and "K" constitutes a complete address data of an address in which the value TI is memorized. Thus selected TI value is applied to the second counter 12.

According to the above example wherein the APEX shutter speed value Tv is 4.25, a combination of binary signals 0 and 1 produced from the lines 5a and 5b, respectively, actuates the decoder 50 to produce high level signal through the line 50b. Thus, the first counter 11 is arranged to reduce the frequency of clock pulse from 81920 Hz to 640 Hz by the divisor $2^7$. At the same time, a combination of binary signals 0, 1, 1 and 1 produced from the lines 6a, 6b, 6c and 6d, respectively, actuates the reading means 7 to produce TI value 22H (corresponding to 34 according to decimal numbering system) towards the second counter 12. After the system has been prepared in the above described condition, the shutter mechanism is controlled in such a manner that the shutter mechanism is opened upon a suitable timing succeeding, such as a pushing of the shutter button and is closed after a time interval of $(1/640)\times 34 = 0.053125$ seconds which is approximately equal to $2^{-4.25}$ seconds.

Figure 3:
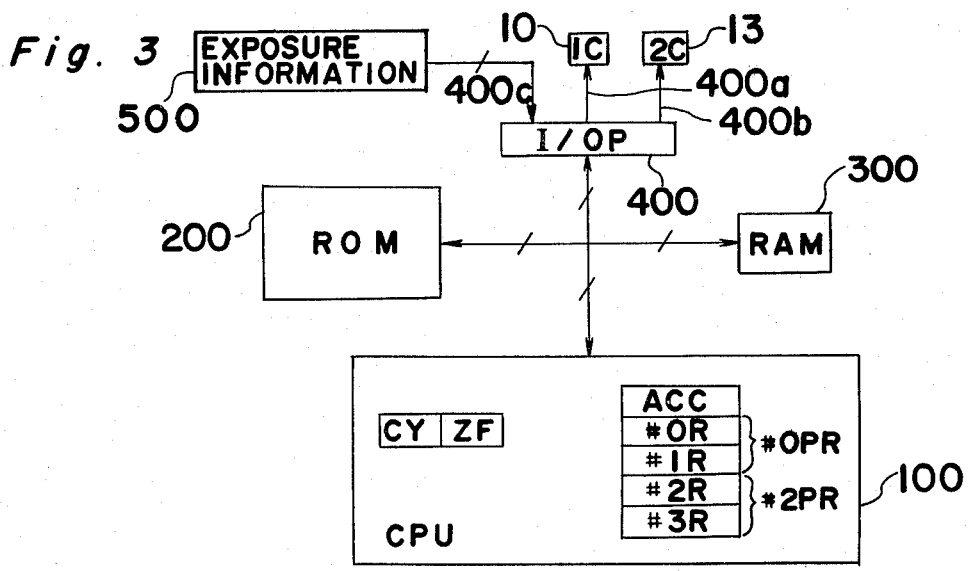
FIG. 3 is a block diagram showing an arrangement for a micro-computer employed for controlling the system shown in FIG. 1.

Referring to FIG. 3, there is shown a block diagram of an exposure control system utilizing a microcomputer, which system practically embodies the system shown in FIG. 1. The micro-computer includes two 8-bit registers functioning as a 16-bit register for carrying out the above described system. A reference number 100 designates a central processor unit (hereinafter referred to as CPU), in which there are included an 8-bit accumulator (ACC), 8-bit registers #0R, #1R, #2R and #3R, a carry flag CY, a zero flag ZF and other necessary parts such as timing controller, arithmetic-logic unit, program counter, machine language encoder, and so on which are omitted for the sake of brevity since they are well known and believed to be not necessary for understanding the present invention. It is to be noted that the registers #0R and #1R can be combined together to form a 16-bit register #0PR while the registers #2R and #3R can be combined together to form another 16-bit register #2PR. A reference number 200 designates a read-only memory (ROM) in which there are memorized necessary data such as data indicative of various values, and data for carrying out the procedure. A reference number 300 designates a random access memory (RAM) for temporarily memorizing data during the calculation process. It is to be noted that the registers contained in the random access memory 300 can be used as registers for calculation particularly when the calculation requires registers more than those contained in the central processor unit 100. A reference number 400 designates an input and output port having output terminals 400a and 400b and input terminal 400c. The output terminal 400a is connected to the shutter opening control means 10 while the terminal 400b is connected to the shutter closing control means 13. The terminals 400c is connected to an exposure information providing means 500 which produces a digital signal indicative of the modified APEX value Tv'.

The modified APEX value Tv' can also be obtained by a computer calculation in which the APEX shutter speed value Tv obtained from automatic setting or manual setting is used for identifying particular address in the read-only-memory where a modified APEX value Tv' correspond to the APEX shutter speed value Tv is contained. Another method for obtaining the modified APEX value Tv' is to suitably design the circuit constants in the A-D converter or to carry out a transfer calculation of $Tv'=10-Tv$ in an additionally provided calculation circuit such as circuit 51 shown in FIG. 2(a). Still another method may be carried out by a direct calculation from the other APEX values such as APEX brightness value Bv, APEX film sensitivity value Sv and APEX aperture value Av.

In the read-only-memory 200, there are memorized TI values 0AH to 88H at various addresses which are identified by address data K+OH to K+FH given in the column under the heading "TIAdd" in the table 1. A procedure of calculation carried out in the microcomputer is described hereinbelow with reference to a flow chart given in FIGS. 4(a) and 4(b).

The modified APEX value of Tv' of six bits signal is fed through the input and output port 400 to the register #1R in the step 1, and further to the accumulator ACC in the step 2. In the accumulator ACC, the first two bits of the modified APEX value Tv' are masked while the last four bits of the modified APEX value Tv' identifying the sub-class are applied to the register #3R. As apparent from the table 1, the value given to the register #3R corresponds to one of values from 00H to 0FH. This value in the register #3R is added with a predetermined value "K" in the step 5 and the sum thereof constituted by sixteen bits signal is impressed on the register #2PR. Then, the data impressed on the register #2PR, that is, the sum is used as an address data for identifying a particular address in the read-only-memory 200. Thereafter, the data contained in the particular address that is, TI value corresponding to the sub-class of presently applied modified APEX value is moved to the register #0R, in the step 6.

The signal corresponding to the first two bits of the modified APEX value Tv' identifying the class are applied to the accumulator ACC as the last four bits of the modified APEX value Tv' are masked.

In the following procedure containing steps 9 to 11, the procedure is divided into four separate calculations for carrying out particular calculation for each of the four different classes. When the contents of the accumulator ACC are equal to 30H, that is, when the modified APEX value Tv' is included in the fourth class, the procedure is continued to g. When the contents of the accumulator ACC are equal to 20H, that is, when the modified APEX value Tv' is included in the third class, the procedure is continued to h. Likewise, when the contents of the accumulator ACC are equal to 10H, that is, when the modified APEX value Tv' is included in the second class, the procedure is continued to i. Finally, when the contents of the accumulator ACC are not equal to any one of the values 30H, 20H and 10H, that is, when the modified APEX value Tv' is included in the first class, the procedure is continued to j. Thereafter, the flow of the calculation proceeds to the chart shown in FIG. 4(b) as described hereinbelow.

Figure 4:
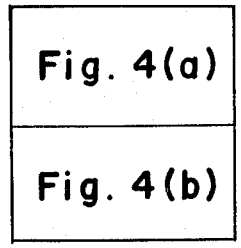
FIGS. 4(a) and 4(b) taken together as in FIG. 4 show a flow chart for carrying out the calculation in the micro-computer shown in FIG. 3.
Figure 4A:
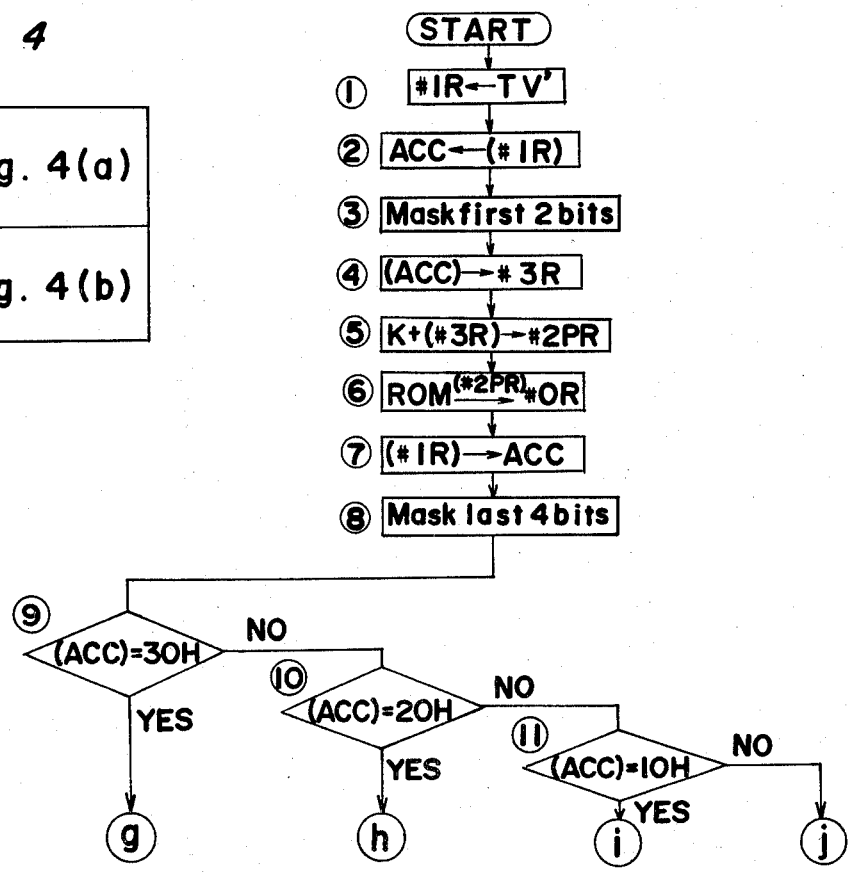
Figure 4:
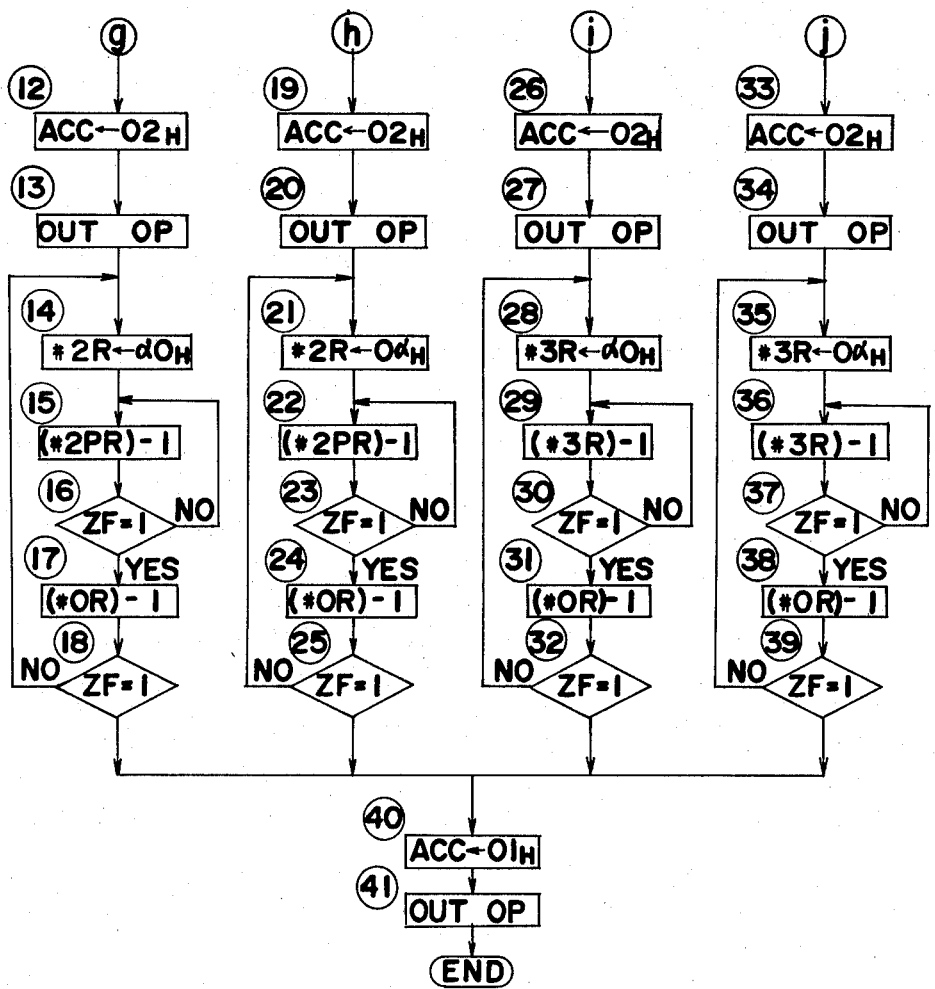

Referring particularly to FIG. 4(b), first the procedure followed by g, that is the procedure for the fourth class, is described hereinbelow. The accumulator ACC sets up a signal 02H for producing a high level signal from the terminal a of the port 400, so that the shutter opening means 10 is actuated to open the shutter mechanism, in the steps 12 and 13. Thereafter, a predetermined value α0H is set up in the register #2R while a value contained in the 16 bits register #2PR is subtracted by one in the step 15. The remainder of the subtraction is examined whether it is zero or not. If the remainder is not zero, the subtraction in the step 15 is repeated. When the remainder is reduced to zero, the zero flag ZF is set up to continue the procedure to the step 17. Since a time duration necessary for the microcomputer to carry out each of the various instructions are known, a time duration from the initiation of the step 14 to that of the step 17 can also be known. Therefore, a reference time of $2^{12-\beta}$ seconds, corresponding to pulse duration of clock pulse having frequency of 2.5 Hz is obtained, which clock pulse corresponds to that from counter 11 in case of FIG. 1 embodiment. Thereafter, the content of the register #0R, that is, the predetermined value TI is subtracted by one in the step 17. The remainder of the subtraction is examined whether it is zero or not. If the remainder is not zero, the procedure in the steps 14, 15, 16, 17 and 18 is repeated until the remainder becomes zero. When the remainder is reduced to zero, the zero flag ZF is set up to continue the procedure of the step 40 in which the accumulator ACC is set up with a value 01H for producing a high level signal from the terminal b of the port 400, so that the shutter closing means 14 is actuated to close the shutter mechanism. Thus, one complete control of the system finishes.

According to the above procedure, a time interval between the actuation of the shutter opening means 10 and the actuation of the shutter closing means 13 can be given by the following equation:

$$t' + 2^{12-\beta} \times 2^{\beta - Tv1} = 2^{-Tv} + t' \quad (2)$$

in which t' is a time duration necessary for carrying out the procedure of steps 12 and 13, and Tv1 is one of the values for Tv in the first class of Table 1. Since such time t' is very short, it can be disregarded of. Therefore, it can be said that the shutter mechanism is opened for a time duration of $2^{31 \, Tv}$.

Next, the procedure followed by h, that is, the procedure for the third class, is described. This procedure includes steps 19 to 25 which are quite similar to the steps 12 to 18 except that the value set up in the register #2R in the step 21 is not α0H, but is 0αH. Therefore, the value set up in the register #2PR in the present procedure will be $\frac{1}{2}^4$ of the value set up in the register #2PR in the above described procedure. Thus, the reference time obtained through the procedure in the steps 22 and 23 is $2^{8-\beta}$ seconds, corresponding to pulse duration of clock pulse having frequency of 40 Hz, which clock pulse corresponds to that from counter 11 in FIG. 1 embodiment. As a consequence, the time duration in which the shutter mechanism is opened can be given by the following equation:

$$2^{8-\beta} \times 2^{\beta - Tv1} = 2^{-Tv} \quad (3)$$

The procedure followed by i, that is, the procedure for the second class, is described. This procedure includes steps 26 to 32 which are quite similar to the steps 12 to 18 except that the value set up in the procedure of the step 28 is α0H in the register #2R, instead of the register #2R. Therefore, the value set up in the register #2PR in the present procedure will be $\frac{1}{2}^8$ of the value set up in the register #2PR in the first described procedure. Thus, the reference time obtained through the procedure in the steps 29 and 30 is $2^{4-\beta}$ seconds, corresponding to pulse duration of clock pulse having frequency of 640 Hz, which clock pulse corresponds to that from counter 11 in FIG. 1 embodiment. As a consequence, the time duration in which the shutter mechanism is opened can be given by the following equation:

$$2^{4-\beta} \times 2^{\beta - Tv1} = 2^{-Tv} \quad (4)$$

Finally, the procedure followed by j, that is, the procedure for the first class, is described. This procedure includes steps 33 to 39 which are quite similar to the steps 12 to 18 except that the value set up in the procedure in the step 35 is 0βH in the register #3R. Therefore, the value set up in the register #2PR in the present procedure will be $\frac{1}{2}^{12}$ of the value set up in the register #2PR in the first described procedure. Thus, the reference time obtained through the procedure in the steps 36 and 37 is $2^{-\beta}$ seconds, corresponding to pulse duration of clock pulse having frequency of 10240 Hz, which clock pulse corresponds to that from counter 11 in FIG. 1 embodiment. As a consequence, the time duration in which the shutter mechanism is opened can be given by the following equation:

$$2^{-\beta} \times 2^{\beta - Tv1} = 2^{-Tv} \quad (5)$$

From the foregoings, a proper exposuring time $2^{-Tv}$ can be given for all of the four classes.

TABLE 2

| TIAdd | TI | First class | | | Second class | | | Third class | | |
|---|---|---|---|---|---|---|---|---|---|---|
| | | Tv | Speed | Tv' | Tv | Speed | Tv' | Tv | Speed | Tv' |
| K+00H | 0AH | 10 0 | ↑ 1/1024 | 00H-01H | | | | | | |
| K+01H | 0CH | 9 ¾ | ↑ | 02H-03H | | | | | | |
| K+02H | 0EH | 9 ½ | ↑ | 04H-06H | | | | | | |
| K+03H | 11H | 9 ¼ | ↑ | 07H-08H | 5 ¼ | ↑ | 2FH-30H | 1 ¼ | ↑ 57-H-58H | |
| K+04H | 14H | 9 0 | ↑ 1/512 | 09H-0BH | 5 0 | ↑ 1/32 | 31H-33H | 1 0 | ↑ ½ | 59H-5BH |
| K+05H | 18H | 8 ¾ | ↑ | 0CH-0DH | 4 ¾ | ↑ | 34H-35H | ¾ | ↑ | 5CH-5DH |
| K+06H | 1CH | 8 ½ | ↑ | 0EH-10H | 4 ½ | ↑ | 36H-38H | ½ | ↑ | 5EH-60H |
| K+07H | 22H | 8 ¼ | ↑ | 11H-12H | 4 ¼ | ↑ | 39H-3AH | ¼ | ↑ | 61H-62H |
| K+08H | 28H | 8 0 | ↑ 1/256 | 13H-15H | 4 0 | ↑ 1/16 | 3BH-3DH | 0 | ↑ 1 | 63H-65H |
| K+09H | 30H | 7 ¾ | A₁ | 16H-17H | 3 ¾ | A₂ | 3EH-3FH | -¼ | A₃ | 66H-67H |
| K+0AH | 38H | 7 ½ | ↓ | 18H-1AH | 3 ½ | ↓ | 40H-42H | -½ | ↓ | 68H-6AH |
| K+0BH | 44H | 7 ¼ | ↓ | 1BH-1CH | 3 ¼ | ↓ | 43H-44H | -¾ | ↓ | 6BH-6CH |

TABLE 2-continued

| | | | | | | | | | | | |
|---|---|---|---|---|---|---|---|---|---|---|---|
| K+0CH | 50H | 7 0 | ↓ | 1/128 | 1DH-1FH | 3 0 | ↓ ½ | 45H-47H | −1 0 | ↓ | 2 | 6DH-6FH |
| K+0DH | 60H | 6 ¾ | ↓ | | 20H-21H | 2 ¾ | ↓ | 48H-49H | −1 ¼ | ↓ | | 70H-71H |
| K+0EH | 70H | 6 ½ | ↓ | | 22H-24H | 2 ½ | ↓ | 4AH-4CH | −1 ½ | ↓ | | 72H-74H |
| K+0FH | 88H | 6 ¼ | ↓ | | 25H-26H | 2 ¼ | ↓ | 4DH-4EH | −1 ¾ | ↓ | | 75H-76H |
| K+10H | A0H | 6 0 | ↓ | 1/64 | 27H-29H | 2 0 | ↓ ½ | 4FH-51H | −2 0 | ↓ | 4 | 77H-79H |
| K+11H | C0H | 5 ¾ | ↓ | | 2AH-2BH | 1 ¾ | ↓ | 52H-53H | −2 ¼ | ↓ | | 7AH-7BH |
| K+12H | E0H | 5 ½ | ↓ | | 2CH-2EH | 1 ½ | ↓ | 54H-56H | −2 ½ | ↓ | | 7CH-7EH |

| | | | Fourth class | |
|---|---|---|---|---|
| TIAdd | TI | Tv | Speed | Tv' |
| K+00H | 0AH | | | |
| K+01H | 0CH | | | |
| K+02H | 0EH | | | |
| K+03H | 11H | −2 ¾ | ↑ | 7FH-80H |
| K+04H | 14H | −3 0 | ↑ 8 | 81H-83H |
| K+05H | 18H | −3 ¼ | ↑ | 84H-85H |
| K+06H | 1CH | −3 ½ | ↑ | 86H-88H |
| K+07H | 22H | −3 ¾ | ↑ | 89H-8AH |
| K+08H | 28H | −4 0 | ↑ 16 | 8BH-8DH |
| K+09H | 30H | −4 ¼ | A4 | 8EH-8FH |
| K+0AH | 38H | −4 ½ | ↓ | 90H-92H |
| K+0BH | 44H | −4 ¾ | ↓ | 93H-94H |
| K+0CH | 50H | −5 0 | ↓ 32 | 95H-96H |
| K+0DH | 60H | −5 ¼ | ↓ | 98H-99H |
| K+0EH | 70H | −5 ½ | ↓ | 9AH-9CH |
| K+0FH | 88H | −5 ¾ | ↓ | 9DH-9EH |
| K+10H | A0H | −6 0 | ↓ 64 | 9FH-A1H |
| K+11H | C0H | −6 ¼ | ↓ | A2H-A3H |
| K+12H | E0H | −6 ½ | ↓ | A4H-A6H |

Figure 5:
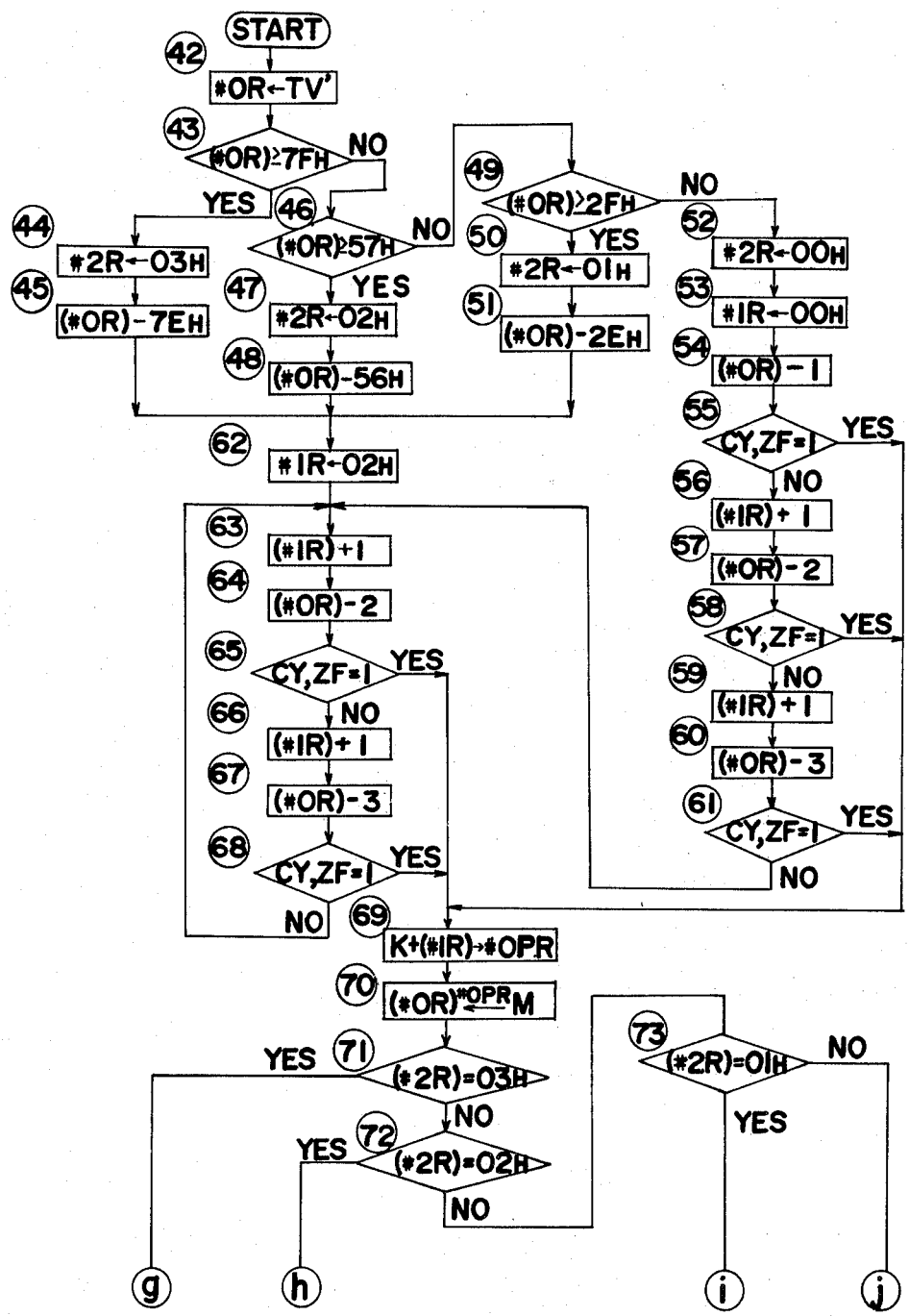
FIG. 5 is a flow chart which can take a place of flow chart shown in FIG. 4(a)

Referring to FIG. 5, there is shown another flow chart which is designed for effecting a procedure together with the flow chart shown in FIG. 4(b) in accordance with a shutter speed information given in a table 2 by the use of micro-computer shown in FIG. 3. In order to carry out the procedure, according to this embodiment read-only-memory 200 previously recorded with various informations such as procedure steps shown in FIGS. 5 and 4(b), and TI values 0AH to E0H given in the column under the heading "TI" at various areas which are identified by the addresses K+00H to K+12H given in the column under the heading "TIAdd". For example, in the area having the address 00H, TI value 0AH is memorized. The values given in the column under the heading "SPEED" show shutter speeds for major Tv values while the values given in the column under the heading "Tv'" show modified APEX values which are equal to 10(10−Tv) and are expressed in a hexadecimal numbering system. The reason for multiplying the value (10−Tv) by 10 is to facilitate the calculation of APEX value by a unit of one tenth of one Ev. Reference characters A1, A2, A3 and A4 accompanied by arrows indicate regions in which the first, second, third and fourth class cover the shutter speed. It is to be noted that when the table is examined by comparing the APEX shutter speed value Tv across the table in one row, that is, comparing the same sub-classes, the APEX shutter speed value Tv varies by the degree of 4. This variation indicates the ratio of shutter speed in a common sub-class between first, second, third and fourth class is $2^0:2^4:2^8:2^{12}$. It is also to be noted that, according to this example, the actually obtained APEX shutter speed value Tv is estimated to one of the values given in the column under the heading "Tv". For example, when the actually obtained Tv value is 8.1 or 7.9, it is estimated to 8.0. Similarly, when the actually obtained Tv value is 7.8 or 7.7, it is estimated to 7.75. And, when the actually obtained Tv value is 7.6 or 7.4, it is estimated to 7.5. Likewise, when the actually obtained Tv value is 7.3 or 7.2, it is estimated to 7.25. For effecting the calculation, the register #0R is recorded with modified APEX value Tv' while the register #1R is recorded with address given in the column under the heading "TIADD". Moreover, the register #2R is recorded with data for the indication of one of the four classes A1, A2, A3 and A4.

Referring now particularly to FIG. 5, the modified APEX value Tv' is recorded in the register #0R by the procedure in the step 42. The memorized value Tv' in the register #0R in compared with a predetermined value 7FH in the procedure in the step 43. When Tv'≧7FH, it is indicated that the modified APEX value Tv' is included in the fourth class A4, and the procedure is advanced to the step 44 in which a value 03H is recorded in the register #2R and, then, a value 7EH is subtracted from the register #0R. Thereafter, the procedure is succeeded to the step 62 in which a value 02H is applied to the register #1R. When Tv'<7FH, the value Tv' is further compared with a predetermined value 57H in the procedure in the step 46. When Tv'≧57H, it is indicated that the modified APEX value Tv' is included in the third class A3, and the procedure is advanced to the step 47 in which a value 02H is recorded in the register #2R and, then, the 56H is subtracted from the register #0R. Thereafter, the procedure is succeeded to the step 62. When Tv'<57H, the value Tv' is yet further compared with a predetermined value 2FH in the procedure in the step 49. Then Tv'≧2FH, it is indicated that the modified APEX value Tv' is included in the second class A2, and the procedure is advanced to the step 50 in which a value 01H is recorded in the register #2R and, then, a value 2EH is subtracted from the register #0R. Thereafter, the procedure is advanced to the step 62.

When Tv'<2FH, it is indicated that the modified APEX value Tv' is included in the first class A1, and the procedure is succeeded through the steps 52 to 61 which are described hereinbelow.

In the step 52, a value 00H is set up in the register #2R while in the step 53, a value 00H is set up in the register #1R. Thereafter, the contents of the register

0R, that is, the modified APEX value Tv' is subtracted by one in the step 54. When the remainder of the subtraction in the step 54 becomes negative or zero, the carry flag CF or zero flag ZF is established to indicate that the modified APEX value Tv' was 00H or 01H. In this case, the procedure is advanced to the step 69. On the other hand, when the remainder of the subtraction is larger than zero, neither the carry flag CF nor zero flag ZF is established to continue the procedure in the steps 56 and 57 in which one is added to the contects of the register #1R while three is subtracted from the contects of the register #0R. When the result of the subtraction becomes negative or zero at this stage, the carry flag CF or zero flag ZF is established to indicate that the modified APEX value Tv' was 02H or 03H, and the procedure is advanced to the step 69. When none of the carry flag CF and zero flag ZF is yet established, the procedure is continued in the steps 59 and 60 in which one is added to the contents of the register #1R while three is subtracted from the contents of the register #00R. In the step 61, it is detected whether or not one of the carry flag CF and zero flag ZF is established to determine whether or not the procedure is to further continue in the steps 63 and 64. The establishment of the carry flag CF and zero flag ZF at this stage indicates that the modified APEX value Tv' has been 04H or 06H.

The procedure in the step 63 starts a set of procedure which continues upto the step 68. This set of procedure containing steps 63 to 68 is similar to the above described steps 56 to 61. It is to be noted that at the step 63, the register #0R contains one of values 07H to 2EH whereas the register #1R contains a value 02H. It is also to be noted that the set of procedure including the step 63 to 68 determines a sub-class which the modified APEX value Tv' belongs to. In the step 69, the contents of the register #1R corresponding to the signal identical with the sub-class are added to the predetermined value K for obtaining an address which is in turn recorded on the register #0PR. By using the address data on the register #0PR, a particular address in the read-only-memory 200 is pointed to read out an information of TI value contained therein. This TI value is moved to the register #0R in the procedure in the step 70.

In the following procedure containing steps 71 to 73, the procedure is divided into four separate calculations for carrying out particular calculation for each of the four different classes A1, A2, A3 and A4. When the contents of the register #2R are equal to 03H, that is, when the modified APEX value Tv' is included in the fourth class A4, the procedure is continued to g. When the contents of the register #2R are equal to 02H, that is, when the modified APEX value Tv' is included in the third class A3, the procedure is continued to h. When the contents of the register #2R are equal to 01H, that is, when the modified APEX value Tv' is included in the second class A2, the procedure is continued to i. Likewise, when the contents of the register #2R are not equal to any one of the values 03H, 02H and 01H, that is when the modified APEX value Tv' is included in the first class A1, the procedure is continued to j. Thereafter, the flow of the calculation proceeds to the chart shown in FIG. 4(b) which has been fully described above.

Figure 6:
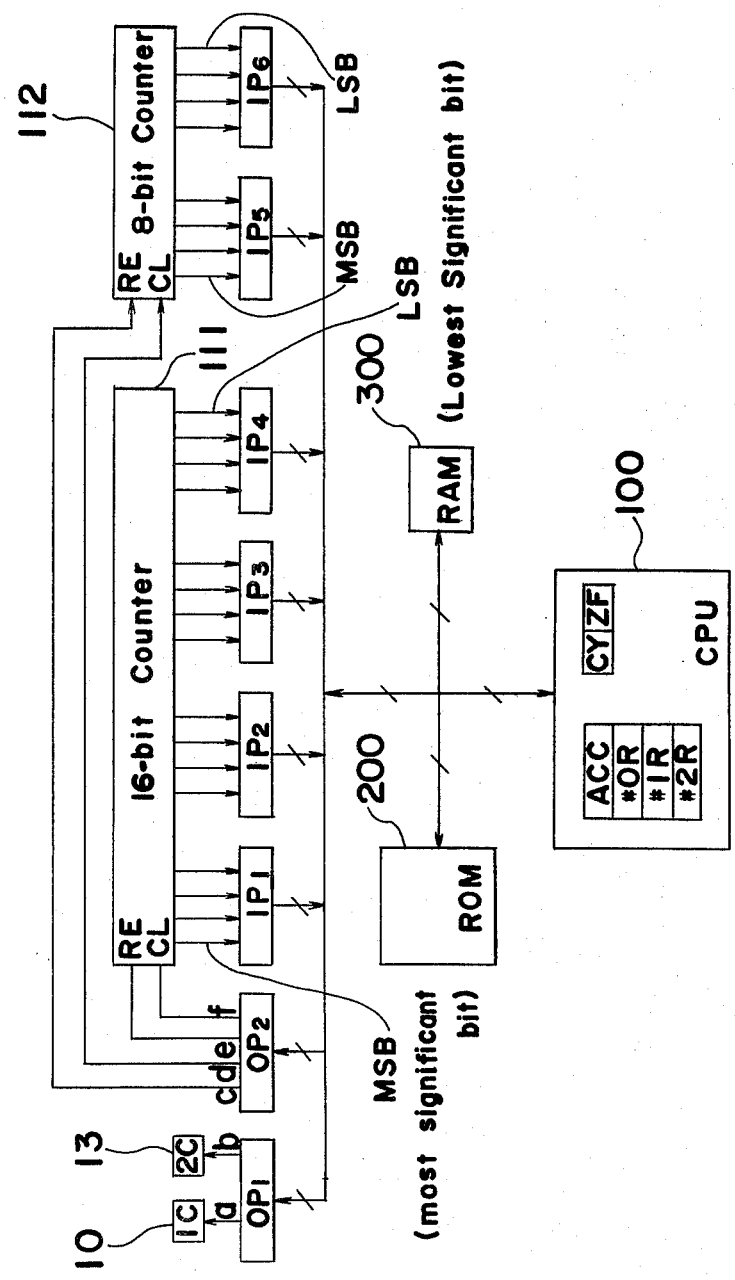
FIG. 6 is a block diagram showing another arrangement for a micro-computer.

Referring to FIG. 6, there is shown a block diagram of an exposure time controlling system according to a further embodiment of the present invention utilizing a four-bit micro-computer. The central processor unit 100 includes four-bit accumulator ACC, three four-bit registers #0R, #1R, and #2R, and two flags CY and ZY as in the previous embodiment. The CPU 100 is connected to the input and output port 400 including eight sections in which the sections designated by reference characters OP1 and OP2 take the position of input port whereas the sections designated by reference characters IP1, IP2, IP3, IP4, IP5 and IP6 take the position of output port. A 16-bit counter 111 including reset terminal RE and clock pulse input terminal CL is provide for establishing a reference time by producing a clock pulse at a frequency arranged for each of the classes. An 8-bit counter 112 including reset terminal RE and clock pulse input terminal CL is provided for counting the reference time, that is, the pulse duration, repeatedly for a number of times determined by the TI value. The output port OP2 has four terminals c, d, e and f which are connected to reset terminal RE of the 8-bit counter 112, clock pulse input terminal CL of the 8-bit counter 112, reset terminal RE of the 16-bit counter 111, and clock pulse input terminal CL of the 8-bit counter 112, respectively. A series of 16 outputs of the 16-bit counter 111 are connected to the input ports IP1, IP2, IP3 and IP4, in which the first four outputs are connected to the input port IP1, the second four outputs are connected to the input port IP2, the third four outputs are connected to the input port IP3 and the fourth four outputs are connected to the input port IP4. In a similar manner, a series of 8 outputs of the 8-bit counter 112 are connected to the input ports IP5 and IP6, in which the first four outputs are connected to the input port IP5 and the second four outputs are connected to the input port IP6.

Figure 7:
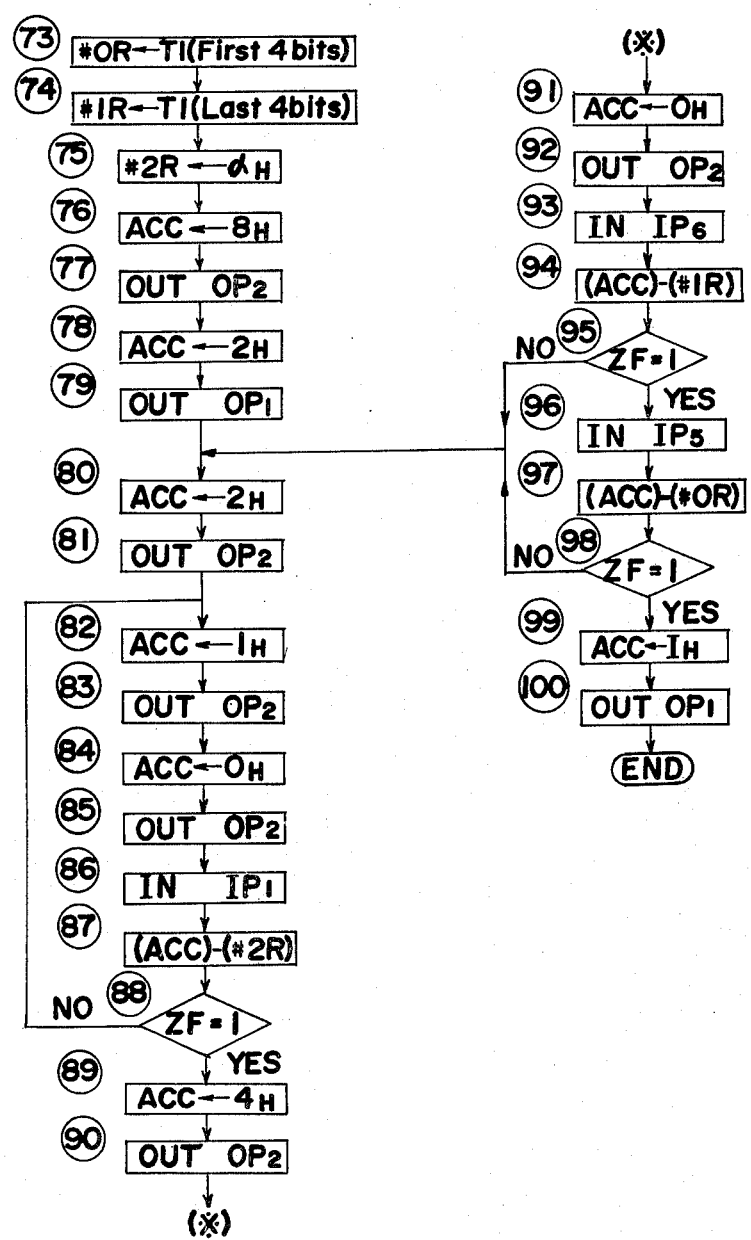
FIG. 7 is a flow chart for carrying out the calculation in the micro-computer shown in FIG. 6.

Referring to FIG. 7, there is shown a flow chart which controls the micro-computer shown in FIG. 6. This flow chart particularly shows a portion for establishing a shutter speed in relation to each of the modified APEX value Tv'. The flow shown in FIG. 7 is particularly directed to a case in which the modified APEX value Tv' is included in the fourth class A4 while a particular TI value is given. In the procedure of the statement 73, the first four bits of the TI value are moved to the register #0R and, in the step 74, the last four bits of the TI value are moved to the register #1R. Thereafter, a predetermined value $\alpha$0H is set up in the register #2R. Then, a value 8H "1000" is set up in the accumulator ACC, while the terminal c of the output port OP2 produces a high level signal for effecting the reset of the 8-bit counter 112. Thereafer, a value 2H "0010" is set up in the accumulator ACC, while the terminal a of the output port OP1 produces a high level signal for actuating the shutter opening control means 10 to open the shutter mechanism.

Next, in the procedure in the step 80, a value 2H "0010" is set up in the accumulator ACC for producing high level signal from the terminal e of the output port OP2. Thus, the 16-bit counter 111 is reset. By the statement 82, a value 1H "0001" is set up in the accumulator ACC for producing output from the output port OP2. Upon setting up of a value 0H "0000" in the accumulator ACC by the statement 84, the output port OP2 produces a high level signal for allowing the 16-bit counter 111 to receive one clock pulse and, thus, the counter 111 counts one. Thereafter, the output from the 16-bit counter 111 is fed to the input port IP1 and, in turn, to the accumulator ACC. In the accumulator ACC, the signal from the counter 111 is compared with the contents of the register #2R for obtaining the difference therebetween. When the difference is not zero, the procedure is returned back to the step 82 for again allowing the 16-bit counter 111 to receive one clock pulse to add one. On the other hand, when the difference is zero, the procedure is advanced to the step 89 in which the first four bits of the output signal from the 16-bit counter is taken out, since the modified APEX value Tv′ is included in the fourth class A4. When the class is different, the procedure of the step 89 is different in a manner described hereinbelow.

In the case where the modified APEX value Tv′ is included in the third class A3, the second four bits of the output signal from the 16-bit counter 111 are taken out. Similarly, in the case where the modified APEX value Tv′ is included in the second class A2, the third four bits of the output signal from the 16-bit counter 111 are taken out. Likewise, in the case where the modified APEX value Tv′ is included in the first class A1, the last four bits of the output signal from the 16-bit counter 111 are taken out. The ratio of reference times established in the statement 89 will be $2^{12-\beta}:2^{8-\beta}:2^{4-\beta}:2-\beta$.

Thereafter, the accumulator ACC receives a value 4H "0100" for producing output from the output port OP2 and then the accumulator ACC receives a value 0H "0000" for producing output from the output port OP2, so that the 8-bit counter 112 receives one pulse which is counted therein. Then, the accumulator Acc receives output signal through the input port IP6 from the 8-bit counter 112, which is compared with the last four bits of the signal indicative of the TI value and contained in the register #1R for obtaining a difference therebetween. When the difference is not zero, the procedure returns back to the step 80 for repeating the procedure of establishing a reference time by resetting the 16-bit counter 111, adding one to the 8-bit counter 112, and comparing the last four bits of the contents in the counter 112 with the last four bits of the TI value. When the difference is zero, the signal from the 8-bit counter 112 applied to the input port IP5 is moved to the accumulator ACC for comparing the value in the accumulator ACC with the first four bits of the TI value contained in the register #0R. When the difference resulted from this comparison is not zero, the procedure returns back to the step 80, whereas when the difference is zero, the procedure advances to the step 99 for setting up 1H "0001" in the accumulator ACC. This setting up of 1H in the accumulator ACC causes the output port OP1 to produce high level signal for actuating the shutter closing control means 13. Thereupon, the shutter mechanism is closed to complete one shutter speed control procedure. It is to be noted that the time duration in which the shutter mechanism is opened by the system described above with reference to FIGS. 6 and 7 can also be given by the equations (2) to (5).

According to the exposure time controlling system of the present invention, the exposure time can be controlled by the designation of one of the addresses of a read-only-memory means and by the counting of a unit time for a number of times determined by the information contained in the designated address. Therefore, the controlling system of the present invention can be simply manufactured at low cost while the control is effected with high accuracy.

The followings are supplemental suggestions to some modification of the above described embodiments. With respect to Table 1, the above embodiment utilizes a calculation "10-Tv" to obtain the signal for Tv′. However, the calculation "10-Tv" may be saved if an A-D converter, which conventionally converts an analog Tv into a digital Tv, is modified so as to directly convert an analog Tv into digital Tv′. According to another modification, it is suggested that an A-D converter is so designed as to convert an analog Tv into a complementary code of the digital Tv′, e.g., to convert an analog Tv=10 into a digital code, "111111", an analog Tv=4.25 into a digital code, "101000", an analog Tv=−5.75 into a digital code, "000000", and the like. In this case, only a digital inversion circuit to invert the digital code from the A-D converter is sufficient for obtaining the desired code for Tv′. Further in the most symplified case, it may be possible to utilize a conventional A-D converter which converts an analog Tv into a digital Tv and to directly designate a class by the higher two bits of a digital Tv code, and a sub-class by the lower four bits of the digital Tv code.

It is needless to say that the number of classes, into one of which the signal indicative of Tv is to be classified, is not necessarily four, but also other numbers are possible, e.g. three classes difined by the difference of $2^5$, or five classes which differ from each other by $2^3$.

With respect to the embodiment in FIGS. 3 and 6, the functions of the counters, such as 11 and 12 in FIGS. 1 and 2, are achieved by utilizing the fact that a time duration necessary for the micro-computer to carry out each of the various instructions is known and the time duration can be a unit of time. Therefore, the embodiment does not include any counter as a hardware. However, a modification, in which a pulse generator for generating clock pulse as a unit time and counters, such as shown in FIG. 2(a), are actually connected to the micro-computer as external elements to be controlled by the micro-computer, may be also suggested. In this case, the counter 11 may be constructed by a conventional t-flip-flop and a gate circuit, and the counter 12 by a conventional presettable counter.

Although the present invention has been fully described above by way of examples with reference to the accompanying drawings, it is to be noted that various changes and modifications are apparent to those skilled in the art. For example, the present invention can be practiced by various types of the micro-computer. In that case, the detailed program may vary with respect to the type of the micro-computer. However, so long as the calculation is proceeded by the APEX value used for identifying a particular value, they should be construed as included within the true scope of the present invention.

What is claimed is:

1. An exposure time controlling system for controlling exposure time by the use of APEX shutter speed value, said exposure time controlling system comprising:
    (a) signal producing means for producing a signal corresponding to the APEX shutter speed value;
    (b) memorizing means having a plurality of addresses for memorizing a plurality of data corresponding to logarithmically expanded values of various APEX shutter speed values, each of said data being memorized at corresponding one of the plurality of addresses of the memorizing means, respectively;
    (c) means for designating one of the addresses in response to the signal of the signal producing means to read out said data memorized at the designated address in said memorizing means; and
    (d) counting means for counting a period of time in accordance with said data read out from said memorizing means to control the exposure time.

2. An exposure system as claimed in claim 1, wherein said signal producing means comprises a light measuring circuit for producing a signal indicative of the brightness of an object and a calculating circuit for calculating APEX shutter speed value.

3. An exposure system as claimed in claim 1, wherein said signal producing means comprises a manual setting circuit for manually setting the APEX shutter speed value.

4. An exposure system as claimed in claim 1, further comprising a means for establishing a unit time, said counting means counts the unit time for a number of times in accordance with said data read out from said memorizing means.

5. An exposure system as claimed in claim 4, further comprising means for classifying said signal of the signal producing means into one of a plurality of classes defined by the magnitude thereof, and wherein said unit time establishing means includes means for varying the unit time in response to the classification of the signal by said classifying means.

6. An exposure system as claimed in claim 5, wherein said designating means designates an address of said memorizing means in response to a relative magnitude of said signal of the signal producing means in the class into which the signal is classified.

7. An exposure system as claimed in claim 6, wherein said signal of said signal producing means in each class is further classified into a plurality of sub-classes by the magnitude thereof, said address being determined by the sub-class which the signal belongs to.

8. An exposure system as claimed in claim 7, wherein said address is determined by the relative relationship of the sub-class to the class to which the sub-class belongs.

9. An exposure time controlling system for controlling a time interval defined between the opening and closing of a shutter mechanism by the use of APEX shutter speed value, said system comprising;
   means for producing a start signal;
   means for producing the APEX shutter speed signal;
   means for classifying said APEX shutter speed signal into one of a plurality of classes defined by the magnitude of the APEX shutter speed signal and for producing a class signal identifying a class into which the APEX shutter speed signal is classified;
   means for sub-classifying said APEX shutter speed signal in any one of said classes into one of a plurality of sub-classes defined by the magnitude of the APEX shutter speed signal and for producing a sub-class signal informing a relative relationship of the sub-class, into which the APEX shutter speed signal is classified to the class to which the sub-class belongs;
   means for setting a unit time interval determined by the class signal;
   means responsive to said start signal for counting said unit time interval for a plurality of times determined by the sub-class signal, said counting means producing an end signal after the plurality of unit time interval is counted;
   means responsive to said start signal for opening the shutter mechanism; and
   means responsive to said end signal for closing the shutter mechanism.

10. An exposure time controlling system as claimed in claim 9, wherein said unit time interval counting means comprises a read-only-memory means which memorizes a plurality of predetermined digits at corresponding plurality of addresses, means for designating one of the addresses in response to the sub-class signal and means for counting the unit of time interval for a plurality of times corresponding to the number memorized at the designated address.

* * * * *